June 2, 1959            I. M. LE BARON            2,889,200
METHOD OF PREPARING DEFLUORINATED MATERIAL
Filed April 21, 1954
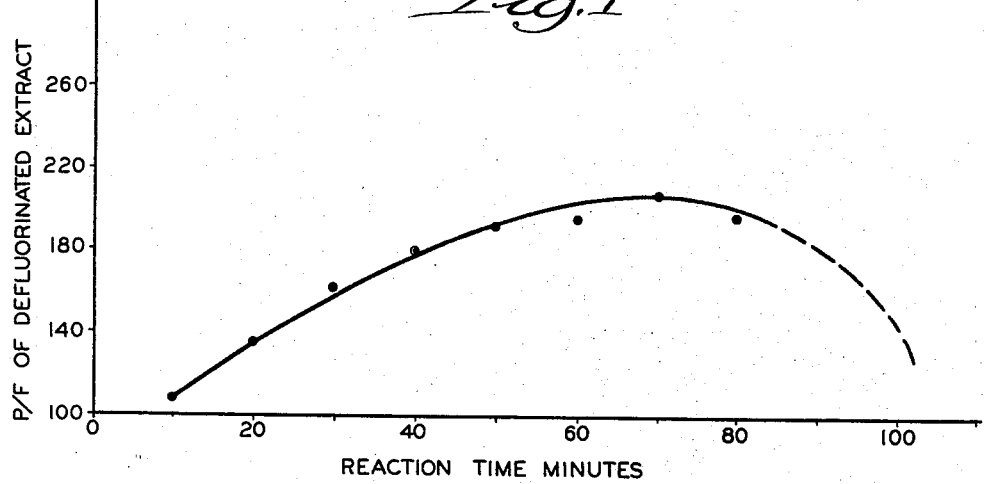
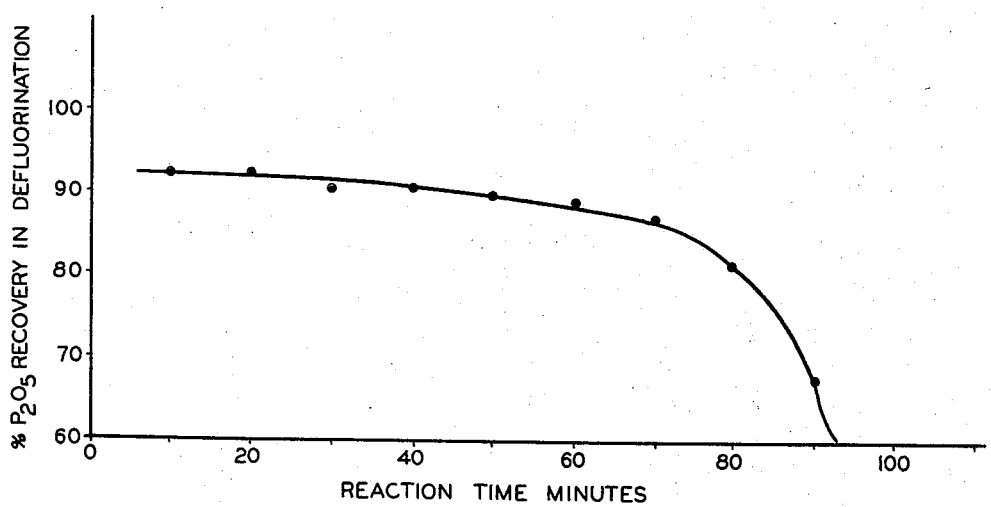
INVENTOR:
Ira Milton Le Baron,
BY
Ernest V. Haines
ATTORNEY.

United States Patent Office 2,889,200
Patented June 2, 1959

2,889,200

METHOD OF PREPARING DEFLUORINATED MATERIAL

Ira Milton Le Baron, Evanston, Ill., assignor to International Minerals & Chemical Corporation, a corporation of New York Application April 21, 1954, Serial No. 424,712

6 Claims. (Cl. 23—109)

This invention relates to a method for producing phosphate material of low fluorine content. More particularly it relates to a novel process for the production of animal food supplement material. Still more particularly it relates to a new and novel method for removing impurities such as fluorine from acidic phosphate solutions.

Various grades of so-called superphosphates are produced in commerce. The fluorine content of these superphosphates preclude their use as animal food supplement material. In an attempt to prepare phosphate materials of low fluorine content, the phosphate values of phosphate rock have been solubilized by reaction with sulfuric acid and the aqueous medium containing the water soluble resultant constituents of the acid-rock reaction has been treated with phosphate rock or lime to remove impurities prior to precipitation of the dicalcium phosphate.

Seyfried 2,115,150 shows a process in which an impure solution of monocalcium phosphate and phosphoric acid is treated with milk of lime in quantities to produce a decanted solution having a pH in the range of 3.5 to 4.5 and to produce solids shown as consisting of dicalcium phosphate and practically all of the iron, aluminum and fluorine.

Moore 2,013,970 also shows a process in which an impure solution of monocalcium phosphate and phosphoric acid is processed to remove impurities by adding lime to the point of complete neutralization of free phosphoric acid, at which point the pH of the solution is approximately 4.4.

Both of these processes have the disadvantage of precipitating a large portion of the $P_2O_5$ material in the purification step, thereby diverting the phosphate content to the relatively low valued fertilizer product with the consequent loss of relatively high value animal feed supplement dicalcium phosphate.

It is a primary object of this invention to overcome the disadvantages and shortcomings of the processes hereinbefore discussed.

It is an object of this invention to provide a process which utilizes limestone for defluorination instead of the more expensive lime.

It is still another object of this invention to provide a process in which the recovery of $P_2O_5$ as a defluorinated product is maintained high by limiting the quantity of dicalcium phosphate to be found in the precipitated defluorination reaction solids.

It is still a further object of this invention to provide a process in which concentration of the solution to be treated with limestone and the pH of the resultant solution are controlled to give a high degree of defluorination while at the same time holding off dicalcium phosphate precipitation.

It is still a further object of this invention to recover a larger proportion than heretofore of solubilized $P_2O_5$ as a defluorinated animal feed supplement dicalcium phosphate.

These and other objects of the invention will be apparent to those skilled in the art from a reading of the following description.

It has now been discovered that the reaction of limestone with acidic phosphorus-bearing solutions containing iron, aluminum, fluorine and the like as impurities can be controlled to effect the precipitation of impurities as a first and almost independent reaction, while the further reaction of limestone and solution to precipitate dicalcium phosphate is delayed so that the unreacted limestone plus the precipitation solids can be segregated prior to the onset of dicalcium phosphate precipitation thereby leaving substantially all of the $P_2O_5$ values in solution for precipitation at a later stage as defluorinated dicalcium phosphate.

In this process an extract solution, for example prepared by leaching ordinary superphosphate, is diluted with water or dilute phosphate solution to obtain a $P_2O_5$ concentration of about 11% to about 20% by weight and preferably a $P_2O_5$ concentration of about 12% to about 15% by weight. The diluted solution is then treated with limestone in proportions to give a pH in the solids-free solution in the range between about 2.3 and about 3.0.

More in detail, extract solution such as is treated in the instant process is prepared by admixing phosphate rock with sulfuric acid to form an acid-mix. A raw phosphatic rock comprises essentially tricalcium phosphate or its equivalent. This phosphatic source material is best utilized if it is finely ground, i.e., about 48% to about 80% being capable of passing through a 200 mesh standard screen. Less finely ground material may be used, but the subsequent acidulation requires a considerably longer time to achieve substantial as well as complete conversion. Generally the finely ground material is allowed to react with sulfuric acid under constant and intensive agitation which is of short duration.

The time of mixing is preferably of the order of one to two minutes, which time is sufficient for thorough mixing and at the same time results in the formation of an easily crushed mass of low bulk density. The temperature of the acid fed to the mixer is generally within the range of about 65° C. to about 100° C.

The sulfuric acid mixed with finely ground rock may be of any convenient dilution, for example, about 50% to about 70% sulfuric acid corresponding to about 40° Bé. to about 55° Bé. It will, of course, be understood that under such conditions concentrations of sulfuric acid higher than mentioned can be utilized.

Acid is added to the ground phosphate rock in such proportions that there will be present in the mix between about 100% and about 115% of the sulfuric acid theoretically required to convert all of the $P_2O_5$ content present in the rock to monocalcium phosphate, allowing in addition enough acid to also react with the impurities such as iron, aluminum, fluorine and the like. The total quantity of acid need not be added all at one time, but may be partially added originally and the remainder added during or before the subsequent leaching step.

Acid mix sets up in about 15 minutes to about 20 minutes into a solid mass which remains friable for indefinite periods of time. This acid-mix as initially formed easily constitutes about 65% solids but may range between about 45% and about 70% solids. The solidified mix may be conveyed directly to succeeding processing steps or it is simply stored until such time as required.

The acid-mix is next subjected to a leaching and then a filtration operation. Acid-mix brought from storage is usually passed through suitable pulverizing apparatus, and the powdered product fed to a mix tank in predetermined quantities where it is mixed with metered amounts of either water, dilute monocalcium phosphate or dilute dicalcium phosphate aqueous solution. The leaching operation may be carried out at a temperature in the range of about 50° C. to about 80° C. in order to reduce the viscostiy of the solution and to improve filtration, provided the mol ratio of $CaO/P_2O_5$ is below about 0.7 to prevent formation of insoluble dicalcium phosphate precipitates.

Leaching operations are preferably carried out by countercurrent flow of liquids and solids. Sufficient liquid leaching medium is added so that the resulting slurry contains between about 35% and about 40% solids, although more concentrated or more dilute slurries may be employed if desired. The agitation and slurrying is for a short period of the order of about five minutes to about fifteen minutes.

In the countercurrent operation water or dilute monocalcium phosphate solution first contacts solids which have passed through successive mixing steps and separations to the last mixing stage. After contact with water or a dilute monocalcium phosphate solution, the undissolved solids are separated and the separated material conveyed to waste or to storage. Rich liquor from the first solids separation stage containing approximately 30% to approximately 35% dissolved solids of which approximately 18% to approximately 24% is phosphate measured as $P_2O_5$ values. This solution is of approximately 30° Bé. to approximately 34° Bé. The separation of phosphatic solution and insoluble solids may be carried out in any convenient or conventional manner such as, for example, by filtration, countercurrent multiple stage centrifuging, or by use of liquid phase cyclone separators.

Phosphate solution recovered from the extract step is an aqueous solution of approximately 20% to approximately 35% by weight solids content. Extract solution comprises essentially monocalcium phosphate and orthophosphoric acid.

Extract solution is diluted to between about 12% and about 20% $P_2O_5$ content and the diluted solution reacted with sufficient calcium carbonate, i.e., generally five pounds to about eight pounds of calcium carbonate per 100 pounds of solution to precipitate iron and aluminum phosphates and calcium fluoride.

Reaction time for a relatively complete defluorination reaction is about 40 minutes to about 120 minutes, with conditions being preferred which give relatively complete defluorination in a period of about 50 minutes to about 80 minutes. The progress of defluorination as measured by the P/F mol ratio is shown in Figure 1. Extract solution having a $CaO/P_2O_5$ mol ratio of 0.65 was agitated in a mixing tank with a 10 inch turbo mixer rotating at 320 r.p.m. Into a portion of the extract was added Ocala limestone ground to a particle size of —65 mesh in a quantity to produce a $CaO/P_2O_5$ mol ratio for the system of 1.17. Samples were removed at 10 minute intervals starting at 10 minutes and analyzed by standard analytical methods for phosphorus and fluorine. This curve illustrates that removal of fluorine from extract solution is most complete with a reaction time of the order of about 70 minutes to about 90 minutes. A P/F weight ratio in excess of 140 is generally acceptable in animal feed supplement materials. However, a higher P/F of 200 is generally sought. A P/F ratio of higher than 140 can be attained with a reaction time of the order of 30 minutes to 40 minutes. A longer reaction time, while it improves defluorination, is not compatible with high recoveries of $P_2O_5$ content of the extract, because a secondary reaction sets in which results in precipitation of dicalcium phosphate before the defluorination solids are removed; and therefore, an appreciable portion of the $P_2O_5$ content of the solution is lost in the defluorination cake. Figure 2, a plot of the percent $P_2O_5$ remaining in the defluorinated extract versus reaction time in minutes, shows that the $P_2O_5$ content of the defluorinated extract falls rapidly after about 60 minutes' to about 70 minutes' reaction time, i.e., that dicalcium phosphate is being precipitated and, therefore, removed from solution as part of the defluorination solids.

By following the process of the instant invention there is a reasonable time for reaction and filtering before the onset of secondary reactions so that the desired P/F mol ratio can be attained before the overall recoveries of $P_2O_5$ in the purified product fall precipitately.

The following is an example of the process as carried out, taking advantage of the instant invention, which is given by way of illustration and without any intention of having the invention limited thereto.

*Example*

About 60 tons per hour of Florida phosphate rock is ground to a particle size approximately 52% of which passes through a 200 mesh standard screen. This rock analyzed about 68% bone phosphate of lime. The ground rock was mixed with about 36 tons per hour of about 98% sulfuric acid added as approximately 53° Bé. aqueous solution. The mixture was thoroughly agitated for about one minute after which it was discharged on to a continuous belt provided with exhaust means for gases such as sulfur dioxide, silicon tetrafluoride, and the like, adjacent the point of discharge of slurry on to the belt. The belt length and its speed were such that the mix remained on the belt approximately 30 minutes. The discharge from the belt was stored in the pile for about 30 days.

The stored material was then removed from storage, broken up and sufficient water added to give a slurry of about 35% undissolved solids. The slurry was subjected to four stages of continuous countercurrent mixing and filtering, the final filtrate being a leached solution containing about 30% dissolved solids and being of approximately 32° Bé. gravity.

The filtrate from the leaching operation was further processed by adding approximately 4.7 tons per hour of limestone or its equivalent in calcium hydroxide. After slurrying for approximately 30 minutes, the slurry was filtered on a drum filter to remove precipitated materials such as calcium fluoride, aluminum phosphate, iron phosphate and the like. The pH of the solution after removal of the solids was approximately 2.8. The slurry was then filtered so that the filtration was completed by the end of a period of one hour from the time of introduction of limestone. The filtrate from the defluorination step analyzed as follows:

|  | Tons per hour |
|---|---|
| $P_2O_5$ | 15.2 |
| Fluorine | 0.033 |
| Sulfate ($SO_4$) | 0.16 |
| Calcium oxide (CaO) | 5.18 |
| $Al_2O_3$ | 0.03 |
| $Fe_2O_3$ | 0.015 |

The solution totaled 136½ tons per hour by weight.

To the defluorinated liquor was added 14.1 tons per hour of calcium carbonate; i.e., Ocala limestone in the following manner:

The defluorinated liquor was fed to a reaction tank No. 1. Ground calcium carbonate was mixed with recycled liquor from the bottom of reaction tank No. 2 in a slurrying tank. Slurry from this tank was proportioned such that approximately 4.2 tons per hour of calcium carbonate was delivered to reaction tank No. 1. Partially reacted slurry from reaction tank No. 1 overflowed into reaction tank No. 2. Limestone slurry was delivered from the slurrying tank to reaction tank No. 2 at the rate giving 9.9 tons per hour of delivered calcium carbonate. Slurry from reaction tank No. 2 overflowed to reaction tank No. 3 and reaction tank No. 3 overflowed to a fourth reaction tank needed to give a holding time for the total reaction of approximately two hours. Slurry delivered from reaction tank No. 4 had a temperature of approximately 180° F.

The slurry was filtered on drum filters, and a cake recovered which in wet form analyzed as follows:

| | Tons per hour |
|---|---|
| $P_2O_5$ | 14.9 |
| F | 0.037 |
| $SO_4$ | 0.14 |
| CaO | 12.69 |
| $Al_2O_3$ | 0.03 |
| $Fe_2O_3$ | 0.01 |
| $CO_2$ | 0.68 |

This cake totaled in weight approximately 50.8 tons per hour. The solids were dried at a temperature to approximately 230° F. to give a product analyzing approximately 20% elemental phosphorus and weighing approximately 32.4 tons. Aqueous medium recovered from the filter analyzing

| | Tons per hour |
|---|---|
| $P_2O_5$ | 0.30 |
| $SO_4$ | 0.02 |
| CaO | 0.25 | was returned to the process at various stages as process water. The solution totaled approximately 94½ tons per hour.

Having thus described and illustrated the character of the instant invention, what is desired to be secured and claimed by Letters Patent is:

1. A method of preparing substantially fluorine-free dicalcium phosphate which comprises reacting comminuted Florida phosphate rock with sulfuric acid of approximately 53° Bé. in a ratio of approximately 10 tons of rock to 6 tons of sulfuric acid, aging the acid rock mix, countercurrently leaching the soluble constituents from the acid rock mix with aqueous medium to produce a leached solution of approximately 32° Bé. gravity, filtering the slurry to recover a solids-free filtrate, diluting the filtrate to approximately 14% $P_2O_5$ concentration, treating the filtrate with calcium carbonate in the ratio of approximately 15 parts of $P_2O_5$ to approximately 4.7 parts of calcium carbonate to produce a pH in the solution ranging between about 2.3 and 3.0, reacting the mixture for approximately 30 minutes, filtering the resultant slurry to separately recover a second filtrate of defluorinated liquor containing substantially all of the $P_2O_5$ values and the precipitated solids and reacting the defluorinated liquor with additional calcium carbonate in the ratio of $P_2O_5$ to calcium carbonate of 1 to 1, filtering the solids after the reaction for approximately 1 hour to recover the dicalcium phosphate precipitated solid material, and drying said solids at a temperature of approximately 250° F. to produce a product analyzing approximately 20% elemental phosphorus.

2. In a process of defluorinating acidic phosphorus-bearing aqueous solutions having iron and fluorine-containing impurities, the phosphorus-bearing portion thereof comprising essentially monocalcium phosphate and ortho-phosphoric acid, and having a $CaO/P_2O_5$ mole ratio below about 0.7, in which substantial amounts of the fluorine-containing impurities are removed from solution by reacting the said acidic phosphorus-bearing aqueous solutions with calcium carbonate to precipitate the fluorine-containing impurities, the improvement comprising reacting said acidic phosphorus-bearing aqueous solutions having a $P_2O_5$ concentration of between about 11% and about 20% by weight with an amount of calcium carbonate sufficient to produce a pH in the solution of between about 2.3 and about 3.0 for a period of between about 40 minutes and about 120 minutes, and at the end of said period, removing the solids from the resultant slurry, whereby substantially all of the $P_2O_5$ values remain in the solids-free defluorinated solution.

3. In a process of defluorinating acidic phosphorus-bearing aqueous solutions having iron and fluorine-containing impurities, the phosphorus-bearing portion thereof comprising essentially monocalcium phosphate and ortho-phosphoric acid, having a $CaO/P_2O_5$ mole ratio below about 0.7, in which substantial amounts of the fluorine-containing impurities are removed from solutions by reacting the said acidic phosphorus-bearing aqueous solutions with calcium carbonate to precipitate the fluorine-containing impurities, the improvement comprising reacting said acidic phosphorus-bearing aqueous solutions having a $P_2O_5$ concentration of between about 11% and about 20% by weight with an amount of calcium carbonate sufficient to produce a pH in the solution of between about 2.5 and about 2.8 for a period of between about 40 minutes and about 120 minutes, and at the end of said period, removing the solids from the resultant slurry, whereby substantially all of the $P_2O_5$ values remain in the solids-free defluorinated solution.

4. In a process of defluorinating acidic phosphorus-bearing aqueous solutions having iron and fluorine-containing impurities, the phosphorus-bearing portion thereof comprising essentially monocalcium phosphate and ortho-phosphoric acid, and having a $CaO/P_2O_5$ mole ratio below about 0.7, in which substantial amounts of the fluorine-containing impurities are removed from solution by reacting the said acidic phosphorus-bearing aqueous solutions with calcium carbonate to precipitate the fluorine-containing impurities, the improvement comprising reacting said acidic phosphorus-bearing aqueous solutions having a $P_2O_5$ concentration of between about 14% and about 17% by weight with an amount of calcium carbonate sufficient to produce a pH in the solution of between about 2.3 and about 3.0 for a period of between about 40 minutes and about 120 minutes, and at the end of said period, removing the solids from the resultant slurry, whereby substantially all of the $P_2O_5$ values remain in the solids-free defluorinated solution.

5. In a process of defluorinating acidic phosphorus-bearing aqueous solutions having iron and fluorine-containing impurities, the phosphorus-bearing portion thereof comprising essentially monocalcium phosphate and ortho-phosphoric acid, and having a $CaO/P_2O_5$ mole ratio below about 0.7, in which substantial amount of the fluorine-containing impurities are removed from solution by reacting the said acidic phosphorus-bearing aqueous solutions with calcium carbonate to precipitate the fluorine-containing impurities, the improvement comprising reacting said acidic phosphorus-bearing aqueous solutions having a $P_2O_5$ concentration of between about 11% and about 20% by weight with an amount of calcium carbonate sufficient to produce a pH in the solution of between about 2.3 and about 3.0 for a period of time in the range of between about 50 minutes and about 80 minutes, and at the end of said period, removing the solids from the resultant slurry, whereby substantially all of the $P_2O_5$ values remain in the solids-free defluorinated solution.

6. In a process of producing dicalcium phosphate involving defluorinating acidic phosphorus-bearing aqueous solutions having iron and fluorine-containing impurities, the phosphorus-bearing portion thereof comprising essentially monocalcium phosphate and ortho-phosphoric acid, in which substantial amounts of the fluorine-containing impurities are removed from solution by reacting the said acidic phosphorus-bearing aqueous solutions with calcium carbonate to precipitate the fluorine-containing impurities, separating the fluorine-containing solids from the liquid phase, and treating the solids-free liquid phase with additional quantities of calcium carbonate to precipitate dicalcium phosphate, the improvement comprising reacting said acidic phosphorus-bearing aqueous solutions having a $P_2O_5$ concentration of about 14% by weight in the ratio of about 15 parts of $P_2O_5$ to about 4.7 parts of calcium carbonate to produce a pH in the solution of between about 2.3 and about 3.0, reacting the mixture for about 30 minutes and separating liquid phase from the fluorine-containing solid phase, reacting the defluorinated liquid phase with additional calcium carbonate in the mole ratio of $P_2O_5$ to calcium carbonate of about 1 to 1, separating the solids from the slurry to recover the dicalcium phosphate precipitate and drying said separated solid precipitate at a temperature of about 250° F. to produce a product analyzing approximately 20% elemental phosphorus.

References Cited in the file of this patent

UNITED STATES PATENTS

| | | |
|---|---|---|
| 1,826,785 | Holz | Oct. 13, 1931 |
| 1,849,704 | Boller | Mar. 15, 1932 |
| 1,851,210 | Palazzo et al. | Mar. 29, 1932 |
| 2,013,970 | Moore | Sept. 10, 1935 |
| 2,115,150 | Seyfried | Apr. 26, 1938 |
| 2,164,627 | Seyfried | July 4, 1939 |
| 2,287,264 | Ogburn | June 23, 1942 |
| 2,312,047 | Ogburn | Feb. 23, 1943 |
| 2,343,456 | Henninger | Mar. 7, 1944 |
| 2,728,635 | Miller | Dec. 27, 1955 |
| 2,759,795 | Archer | Aug. 21, 1956 |
| 2,767,045 | McCullough | Oct. 16, 1956 |

FOREIGN PATENTS

| | | |
|---|---|---|
| 336,692 | Great Britain | Oct. 23, 1930 |